(12) United States Patent
Lee

(10) Patent No.: US 8,346,979 B1
(45) Date of Patent: Jan. 1, 2013

(54) CONNECTIVITY SLED FOR ELECTRONIC PAIRING AND PHYSICAL COOPERATION BETWEEN A MOBILE DEVICE AND ASSOCIATED PERIPHERAL DEVICES

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 0 days.

(21) Appl. No.: 13/177,465

(22) Filed: Jul. 6, 2011

(51) Int. Cl.
*G06F 3/00* (2006.01)
*G06K 7/08* (2006.01)

(52) U.S. Cl. ............................................ 710/5; 235/449
(58) Field of Classification Search ....... 710/5; 235/449
See application file for complete search history.

(56) References Cited

U.S. PATENT DOCUMENTS

| | | | | |
|---|---|---|---|---|
| 2002/0170969 A1* | 11/2002 | Bridgelall | ................ | 235/462.13 |
| 2005/0247787 A1* | 11/2005 | Von Mueller et al. | ........ | 235/449 |
| 2006/0046793 A1 | 3/2006 | Hamilton et al. | | |
| 2007/0297149 A1 | 12/2007 | Richardson et al. | | |
| 2009/0066294 A1 | 3/2009 | Sabram | | |

FOREIGN PATENT DOCUMENTS

| | | |
|---|---|---|
| EP | 1220367 A1 | 7/2002 |
| WO | WO 20041017613 A1 | 2/2004 |
| WO | WO 2005/104655 A2 | 11/2005 |
| WO | WO 2011/011649 A1 | 1/2011 |
| WO | WO 2011/146774 A1 | 11/2011 |

* cited by examiner

*Primary Examiner* — Hyun Nam
(74) *Attorney, Agent, or Firm* — Robert S. Gorman; Gorman Law Offices

(57) ABSTRACT

The present invention relates to an apparatus and method offering a specialized modular sled systems for combination, both in a physically proximate sense, and electronically peripheral devices such as a compact bar code scanner, magnetic strip reader, IC card reader, RF tag reader, charging base etc., without the need for cables, and with structural capabilities that offer the ability for a user to employ the same in substantially simultaneous fashion through a consolidated physical integration that eliminates awkward manual manipulation of the same.

13 Claims, 14 Drawing Sheets

CONNECTIVITY SLED FOR ELECTRONIC PAIRING AND PHYSICAL COOPERATION BETWEEN A MOBILE DEVICE AND ASSOCIATED PERIPHERAL DEVICES

FIELD OF THE INVENTION

The present invention relates to a method for operative physical cooperation between a mobile phone or PDA and an associated peripheral device, and improved methods for both physically combining the above and for electronically connecting the same.

DISCUSSION OF THE RELATED ART

Recently, mobile terminal such as mobile phones, smart phones and/or PDAs are becoming widely used as more than mere communication or media devices. There are a variety of applications for such mobile terminals that strive to amplify the abilities of such terminals for additional purposes that may be achieved through the use of special purpose peripherals that can be connected thereto.

However, when the mobile terminal is connected to certain peripheral devices, effective operation between the same is often limited by the fact that it is difficult to use the devices at the same time, especially given the need to maintain proximate electronic connectivity ranges and given the physical limitations inherent in trying to manually hold or manipulate all of the above at the same time during the course of operation by an end user.

Current approaches for using any of the above devices have been hitherto limited to employment of awkward physical and electronic connections required for the simultaneous use and connection of the peripheral devices that a user may wish to associate therewith. Moreover, certain peripheral devices such as handheld barcode scanning devices and Magnetic Strip Readers (MSRs) currently are not readily able to be associated with mobile terminals such as mobile telephonic devices.

SUMMARY OF THE INVENTION

The present invention relates to a mobile device and peripheral device consolidation system for providing improved interoperability between a mobile device and a peripheral device. More particularly, the present invention is directed to a system and method for providing both a physical and electronic approach to enabling a mobile terminal to be readily and conveniently paired with a peripheral device, including bar code readers and MSRs that substantially obviates one or more problems due to limitations and disadvantages of the related art.

The proposed invention therefore relates to a novel approach to augmenting the use of PDAs, mobile phones and smart phones with peripheral add-on devices such as compact bar code scanners and magnetic strip readers (MSRs) and virtually any other manner of compact peripheral device. When a peripheral device (such as the illustrative handheld barcode scanning device and/or MSR) needs to be used and with a PDA, mobile phone or smart phone, the present invention thusly provides a physical and electronic platform or "sled" that can physically attach any of the aforementioned to each other in a convenient, modular fashion. In doing so, the present inventive approach utilizes a plastic housing that can house a handheld barcode scanning device and/or a MSR in a streamlined, consolidated fashion for ready attachment to the back of a mobile device, with an electronic communication being afforded between all devices in a variety of ways, including according to wireless communication means, such as a connection via a Bluetooth®-protocol based connection available from the Bluetooth SIG Inc., of Kirkland, Wash.

Furthermore, in one optional instantiation, provision of such means that a user can easily employ a hands-free trigger connected to the handheld barcode scanning device or other apparatus while the same is currently connected via a Bluetooth®-protocol based connection to the other aforementioned devices. The inventive approach is therefore especially valuable in that permits usage of mobile phones, smart phones and PDAs with a handheld barcode scanning device, a MSR, or other apparatus in a wireless, physically compact and consolidated fashion that requires little or no set up and integration, and which can furthermore be employed in a hands-free mode, if required.

Accordingly, the present invention offers for the following beneficial advances relating to providing a mobile device and peripheral device consolidation system for providing improved interoperability between a mobile device and a peripheral device through: (1) provision of a "sled" that comprises a physical smart phone/cell phone cover that can provide for convenient, durable physical attachment between the same and peripheral devices; (2) provision of optional side scan button utilizing a hands free trigger technology; (3) provision of said sled with physical capacity for insertion of optional peripheral device such as a compact bar code reader and/or a MSR; (4) inherent modularity for connection of each of the above-referenced devices, whereby the sled may be used to connect the peripheral device (bar code reader and/or MSR, etc.) with the smart phone/cell phone via a wireless connection such as a Bluetooth®-type connection, without the need for use of a physical electronic connector (cable); (5) enabling a user, through the inventive architecture, to change smart phones/cell phones (as well as peripherals such as the compact bar code reader and/or MSR) periodically, without replacing the inventive sled; (6) provision of a supplemental battery pack within the sled that allows a user to charge the smart phone/cell phone using a sled battery pack contained within the sled; (7) provision of a wireless port, such as an illustrative dual Bluetooth® port which offers a first port which can wirelessly connect the sled with the smart phone/cell phone, and a second port which can wirelessly connect the sled and other Bluetooth® devices, such as Bluetooth® based printer.

Broadly speaking, the inventive modular approach therefore may use three component parts as an independent system and/or as a compact barcode reader by itself with or without an MSR. This modularity can facilitate ongoing use of the system with little to no modifications in the case of where a user desires to switch or replace a given mobile device. Moreover, the actual design of the modular sled is such that it can be used on all types of mobile devices, without blocking the mobile device communications and/or charging ports, and also supports all manner of native services, even those from specialized smart devices, such as iTunes®-type devices made by from Apple, Inc. of Cupertino, Calif. To this end, the present invention overcomes the aforementioned and other disadvantages inherent in the prior art.

Technical subject matters to be realized by embodiments of the present invention are not limited to the following technical subject matters, and other technical subject matters not mentioned in the following description may be easily appreciated by those skilled in the art to which the present invention pertains, without difficulty. Accordingly, additional advantages, objects, and features of the invention will be set forth in part in the description which follows and in part will become apparent to those having ordinary skill in the art upon examination of the following may be learned from practice of the invention. The objectives and other advantages of the invention may be realized and attained by the structure particularly pointed out in the written description and claims hereof as well as the appended drawings. It is therefore to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
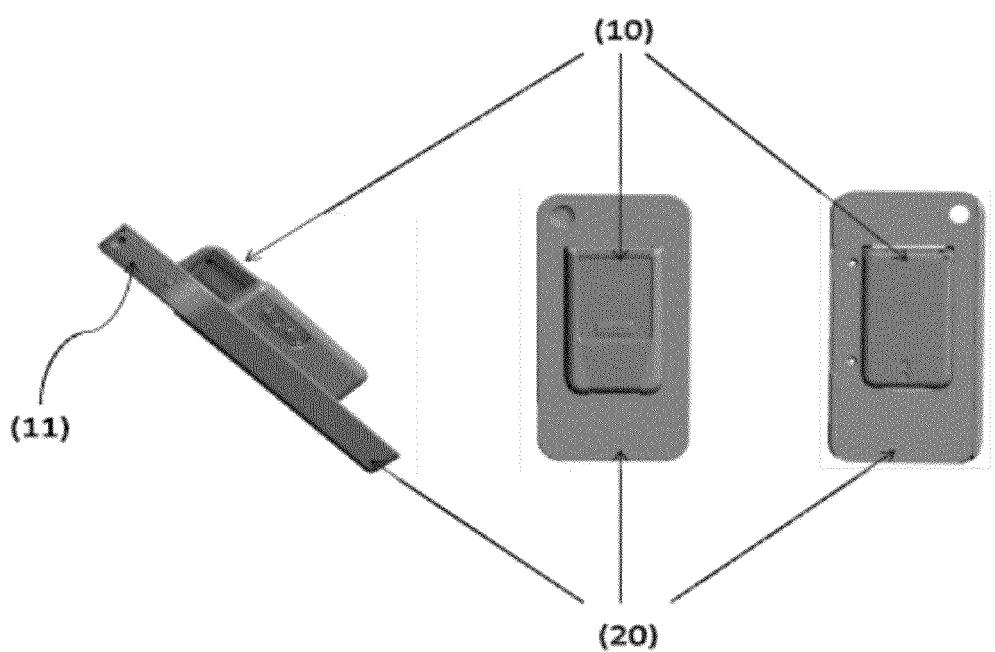
FIG. 1A depicts an illustrative cooperative physical engagement of a mobile device and an illustrative peripheral device, such as a compact bar code reader, that would effectuate the novel operations performed therebetween according to one embodiment of the present invention.

To achieve the objects and other advantages and, in accordance with the purpose of the invention as embodied and broadly described herein, the proposed invention relates at its broadest level, to a method and apparatus whereby improved interoperability between the peripheral device and a mobile terminal is provided according to the following which comprises a method and a mobile device and peripheral device consolidation system for providing improved interoperability between a mobile device and at least one peripheral device, the mobile device and peripheral consolidation system comprising: (a) a modular sled having an attachment means for attaching the at least one peripheral device to the mobile device, the attachment means for attaching the at least one peripheral device to the mobile device providing at least one point of secure attachment with at least one of the following of a custom engagement structure, universal engagement structure, or a native mobile device casement engagement structure, the modular sled being further structurally provided for so as to cooperatively secure, physically proximate to the mobile device; (b) the modular sled further including at least one of the following peripheral devices comprising: compact bar code readers, MSRs, charging bases, IC card readers, peripheral device triggers, or RF ID tag readers; and (c) the modular sled further including electronic circuitry for provision for electronic connectivity between the mobile device and the at least one peripheral device. In additional embodiments, the inventive mobile device and peripheral device consolidation system for providing improved interoperability between a mobile device and at least one peripheral device further includes electronic circuitry for provision for supplemental power connectivity between said at least one peripheral device and said mobile device, as well as for a peripheral device trigger.

In another broad embodiment, the present mobile device and peripheral device consolidation system for providing improved interoperability between a mobile device and at least one peripheral may further include a sled which provides for: (a) a memory unit configured to store instructions in a peripheral device; (b) at least one configurable key in a peripheral device and/or mobile device for implementing user commands selected from the group comprising at least one of the following of a toggle command, a wake up process, a connection process, a data collection process, a synchronization process, and a transmission process; (c) a processor connected to said at least one key, both of which are configured to execute instructions for executing at least the following instructions: (i) establishing a wireless connection between the at least one peripheral device and said mobile device upon receiving a user data connection process command; (ii) executing a data collecting function of said peripheral device upon receiving a user data collection process command; (iii) executing a synchronization process, if required; (iv) transmitting, any data collected during said data collecting function, from said at least one peripheral device, to said mobile device. The aforementioned may be accomplished in accordance with the particulars described herein, as well optionally through additional particulars that maybe found in pending U.S. patent application Ser. No. 13/018,286, titled "HID Protocol-based Soft Keyboard Toggle With Initialization and Synchronization Capability for Mobile Phones and PDAs Connected to a Peripheral Device", filed Jan. 31, 2011, pending U.S. patent application Ser. No. 12/384,022, titled "Method and Apparatus for Improved Interfacing of Connections Between a Multiplicity of Handheld Devices", filed Mar. 31, 2009, pending U.S. patent application Ser. No. 12/384,023, titled "Method and Apparatus for Improved Automatic Bluetooth Device Identification for Data Exchange", filed Mar. 31, 2009, and pending U.S. patent application Ser. No. 12/798,184, titled "Method and Apparatus for Improved Connection of Wireless Devices Using Third Party Programming Capability", filed Mar. 31, 2010, all of which are hereby incorporated by reference in their entirety.

Reference will now be made in detail to the illustrative embodiments of the present invention, examples of which are illustrated in the accompanying drawings. Wherever possible, the same reference numbers will be used throughout the drawings to refer to the same or like parts. Constituent components and operations of the present invention shown in the drawings will be disclosed only for illustrative purposes of the present invention, such that technical spirit, important constructions and operations of the present invention are not limited to only the following embodiments, and can also be applied to other embodiments.

FIG. 1A illustrates an example of one illustrative embodiment of the inventive mobile device and peripheral device consolidation system for providing improved interoperability between a mobile device and a peripheral device. As depicted therein, an inherent part of the modular sled aspect of the present invention comprises (at least one) peripheral device 10 physically consolidated or connected with mobile device 11 via an attachment means 20 for attaching the at least one peripheral device to mobile device 11, as well as provides for electronic connection between the respective devices, as described hereafter. Peripheral device 10 of the modular sled may be of any type of at least one of the following peripheral devices comprising: compact bar code readers, MSRs, charging bases, IC card readers, peripheral device triggers, or RF ID tag readers, but for purposes of illustration in this particular example, a compact bar code reader is shown in FIG. 1A. Those skilled in the art will appreciate that various modifications, additions and substitutions are possible from this description, but in general, mobile device 11 is of the type chosen from the groups comprising mobile phones, smart phones, PDAs, and the like. In any case, Mobile device 11 may be connected in a wired fashion (not depicted), or alternatively, in a wireless fashion to the peripheral device 10 of the inventive sled through a protocol such as the illustrative Bluetooth® protocol.

Figure 7A:
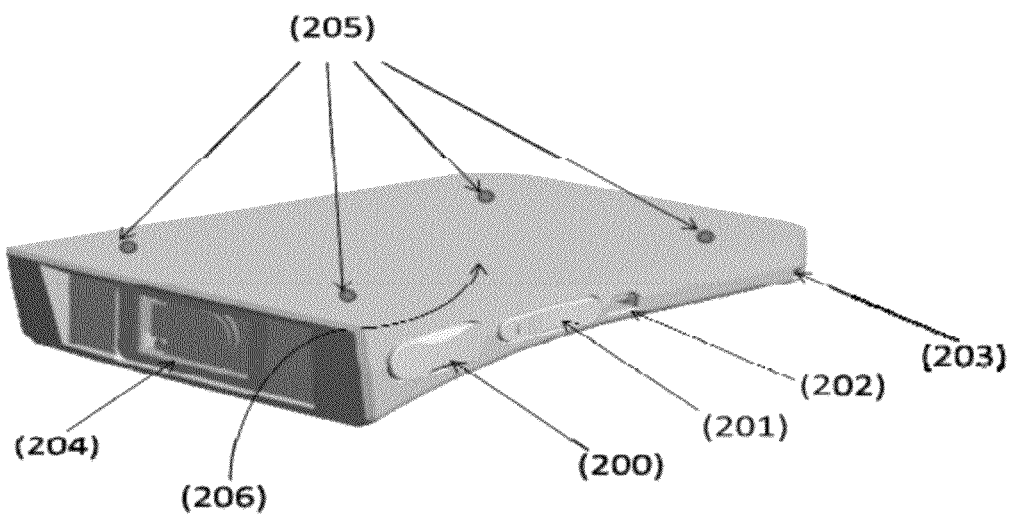
FIG. 7A depicts an offset top view of a variant of an illustrative peripheral device, such as a compact bar code reader with an illustrative cooperative physical engagement holes for attachment to a native mobile device casement engagement structure that would effectuate the novel operations performed therebetween according to one embodiment of the present invention.

As will be shown hereafter by way of additional figures and illustrations, attachment means 20 provides at least one point of secure attachment and is structurally provided for so as to cooperatively secure, in a physically proximate fashion, peripheral device 10 to mobile device 11. Attachment means 20 may be configured in a multitude of ways, such as according to at least one of the following of a custom engagement structure (see hereafter FIGS. 7C and 7D), universal engagement structure (see hereafter FIG. 7E), or a native mobile device casement engagement structure depicted herein, with an off the shelf smart phone cover having holes (not depicted), locking prongs (not depicted), or other means that can accommodate approaches such as a clicking adapter system 101, shown in FIG. 2A, or through mounting screws and holes 205, as shown in FIG. 7A, hereafter. As can be appreciate, other variants of attachment means 20 may also be employed, such as hook and loop fastening, double sided tape, and/or glue for physically securing the aforementioned.

Figure 1B:
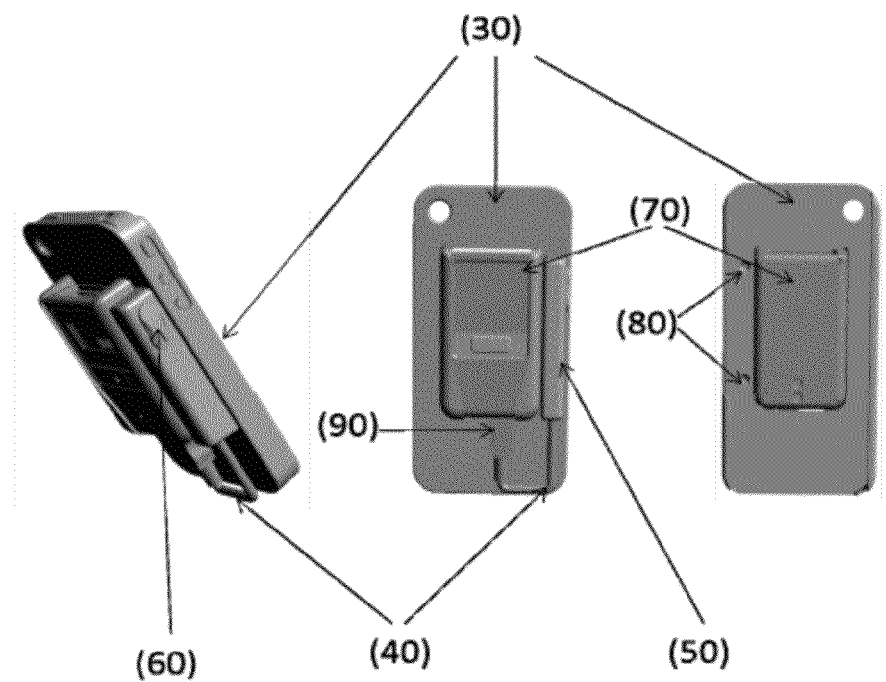
FIG. 1B depicts an illustrative cooperative physical engagement of a mobile device and an illustrative peripheral device, such as a compact bar code reader with a peripheral trigger, that would effectuate the novel operations performed therebetween according to one embodiment of the present invention.

FIG. 1B depicts approximately the same system described above in regards to FIG. 1A, but with the addition of an optional side scan button utilizing a peripheral device trigger which can, in one embodiment, be mounted to a sled surface are (not depicted) or to the off the shelf mobile device case (e.g., the native mobile device casement engagement structure part of attachment means 20). The specific type of peripheral device trigger may vary, but in one embodiment, may be provided according to that described in U.S. patent application Ser. No. 13/014,446, titled "Handheld Barcode Input Device With No-Power Supplied Trigger", filed Jan. 6, 2011, hereby incorporated by reference in its entirety. In any case, the inventive sled utilizing an optional side scan button utilizing a peripheral device trigger as shown in FIG. 1B might comprise an illustrative mobile device case 30, trigger cable 40, trigger box 50, trigger button 60, peripheral device (illustrative compact barcode scanner 70), trigger box mounting hole 80, and trigger cable connector 90 for a wired connection to compact barcode scanner 70.

Figure 2A:
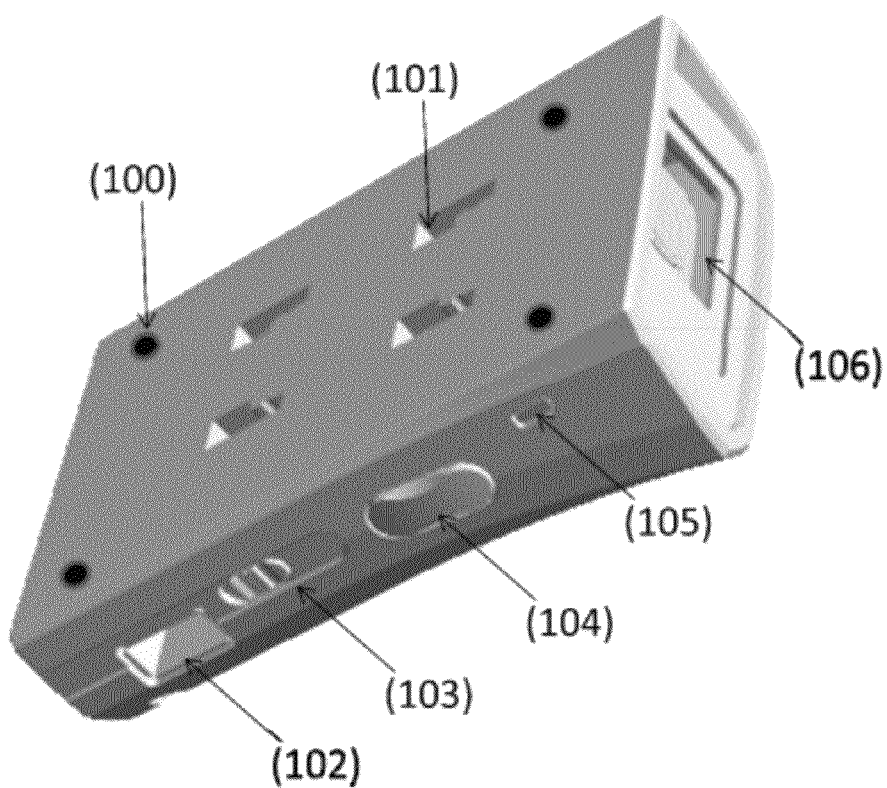
FIG. 2A depicts an offset top view of an illustrative peripheral device, such as a compact bar code reader with an illustrative cooperative physical engagement holes for attachment to a native mobile device casement engagement structure that would effectuate the novel operations performed therebetween according to one embodiment of the present invention.
Figure 2B:
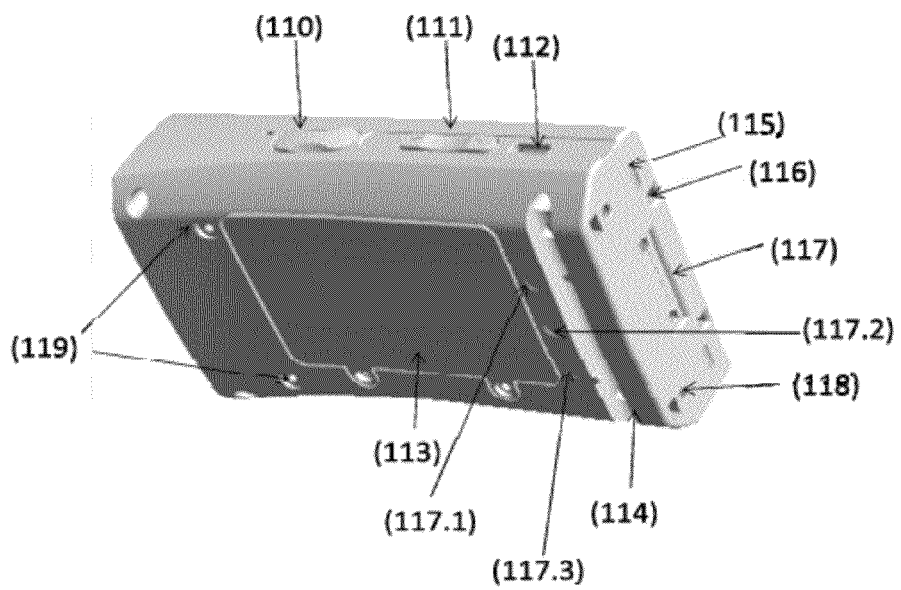
FIG. 2B depicts an offset bottom view of an illustrative peripheral device, such as a compact bar code reader with illustrative features for operative connection and controls that would effectuate the novel operations performed therebetween according to one embodiment of the present invention.

FIG. 2A depicts an offset top view of one illustrative embodiment of a peripheral device portion of the inventive modular sled, in this case, and exemplary compact bar code reader such as a KDC® 400 type unit, available from KoamTac® Inc., of Princeton, N.J., with an optional MSR. This illustrative embodiment shows one example of attachment means 20 wherein either a custom engagement structure, or a native mobile device casement engagement structure (e.g., utilizing an off the shelf smart phone cover having holes (not depicted)) may be utilized. In either case, locking prongs (not depicted) may be provided therefrom so as to locking engage as a clicking adapter system 101, or alternatively, locking engagement may be provided through mounting screws maybe provided therefrom (not depicted) for a screw type engagement with mounting holes 100. On a separate note, it is further described that such a peripheral device may also include a USB connector 102, Power On/Off Switch 103, trigger button 104, status LED 105, and a barcode scan engine (1D laser and 2D imager) 106. Similarly, FIG. 2B depicts an offset bottom view of the same illustrative embodiment of a peripheral device provided with the aforementioned details, plus trigger button 110, Up/Down button 111, an 8PIN Ultra Micro USB Connector 112, battery case cover 113, cable guide 114, status LED 115, guide hole 116, connector to MSR and charging base 117, charging contact (Vcc) 117.1, trigger contact 117.2, ground 117.3, (integrated) MSR base 118 with trigger gun handle connecting screw, and trigger gun handle mounting means/screw 119.

Figure 3A:
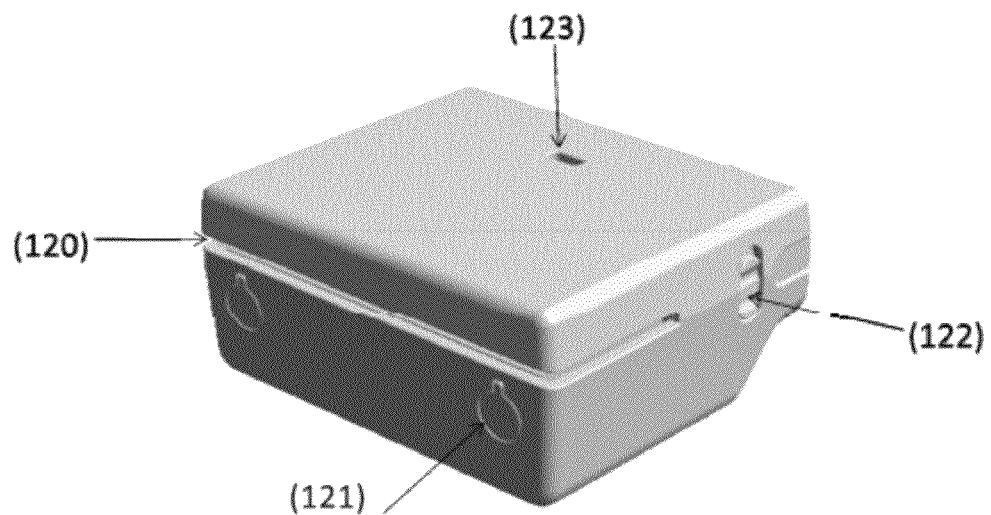
FIG. 3A depicts an offset frontal side view of an illustrative peripheral device, such as a MSR with illustrative features for operative connection and controls that would effectuate the novel operations performed therebetween according to one embodiment of the present invention.
Figure 3B:
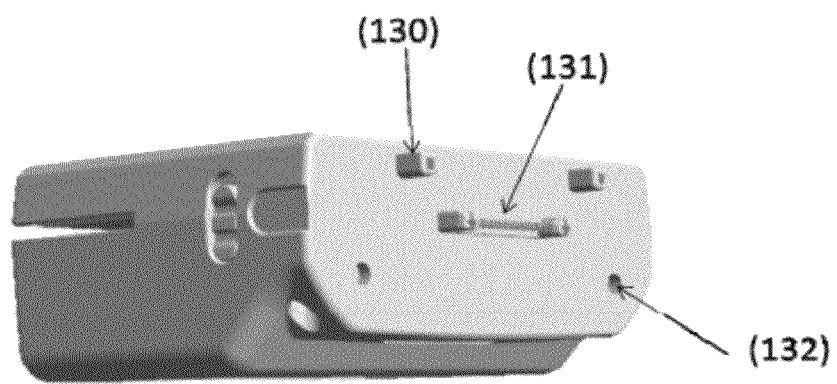
FIG. 3B depicts an offset back side view of an illustrative peripheral device, such as a MSR with illustrative features for operative connection and controls that would effectuate the novel operations performed therebetween according to one embodiment of the present invention.
Figure 4:
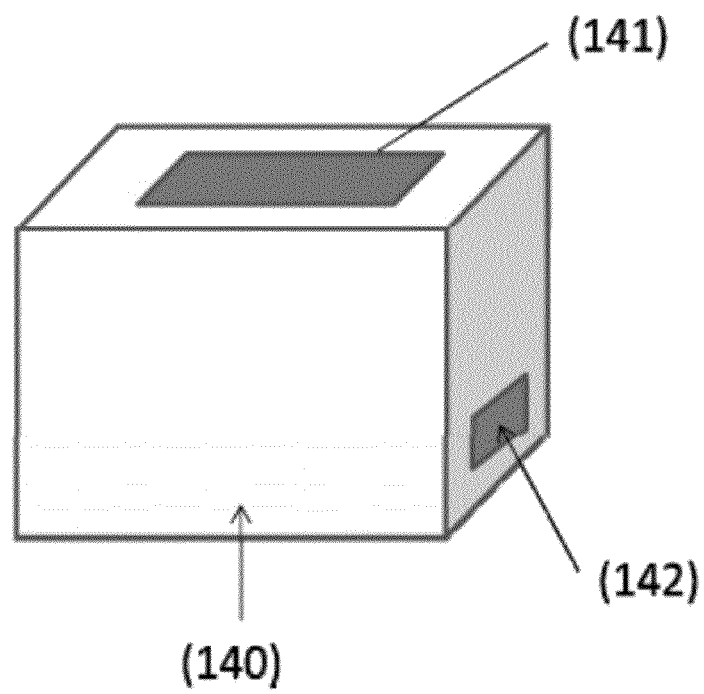
FIG. 4 depicts an three dimensional side view of an illustrative peripheral device, such as a charging base with illustrative features for operative connection and controls that would effectuate the novel operations performed therebetween according to one embodiment of the present invention.
Figure 5:
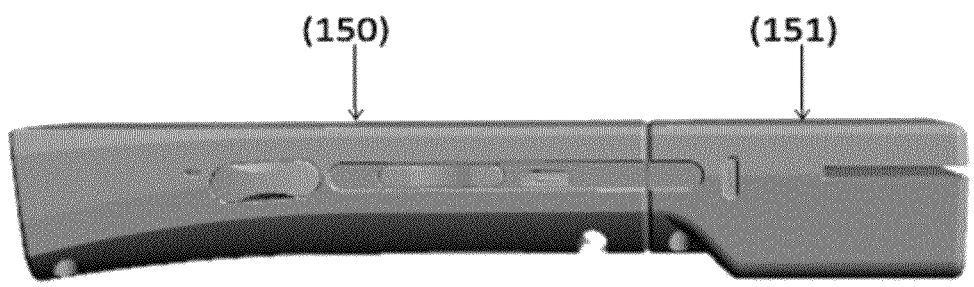
FIG. 5 depicts a side view of two illustrative peripheral devices, such as a compact bar code scanner mated with a MSR that would effectuate the novel operations performed therebetween according to one embodiment of the present invention.

FIG. 3A depicts an offset frontal/top view of one illustrative embodiment of a peripheral device portion of the inventive modular sled, in this case, and exemplary MSR module 120 that may be stand alone, or otherwise integrated with the above described compact bar code reader. As depicted therein, MSR module 120 may be provided with a connecting means 121 (connecting screw insert hole, as part of attachment means 20 (as described elsewhere), power switch 122, and status LED 123. Similarly, FIG. 3B depicts an offset back/side view of one illustrative embodiment wherein exemplary MSR module 120 may be provided with guide bar 130, connector to the barcode base 131, and MSR and barcode connecting means/screw hole 132 (as part of attachment means 20, as described elsewhere), for use with either a custom engagement structure, or a native mobile device casement engagement structure). When MSR module 120 is integrated with compact bar code reader 10 (as described elsewhere), charging base 140, shown in FIG. 4A, may be utilized where barcode and MSR base insert hole 141 and USB connector 142 are provided for optimal connectivity and power supply provision. When provided in accordance with this approach, an integrated barcode 150 and MSR base 151 may be seen as configured in the side view shown in FIG. 5.

Figure 3C:
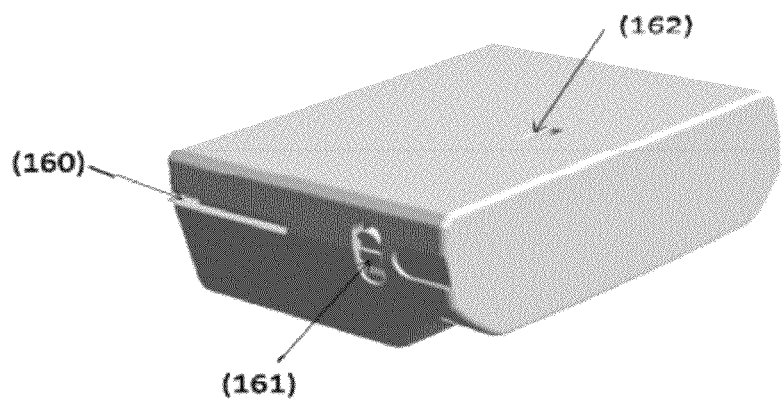
FIG. 3C depicts an offset back side view of an illustrative peripheral device, such as a MSR with illustrative features for operative connection and controls that would effectuate the novel operations performed therebetween according to one embodiment of the present invention.
Figure 3D:
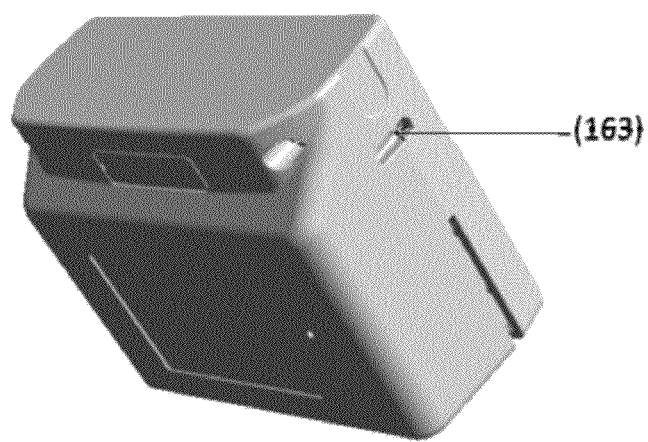
FIG. 3D depicts an offset bottom side view of an illustrative peripheral device, such as a MSR that would effectuate the novel operations performed therebetween according to one embodiment of the present invention.
Figure 8:
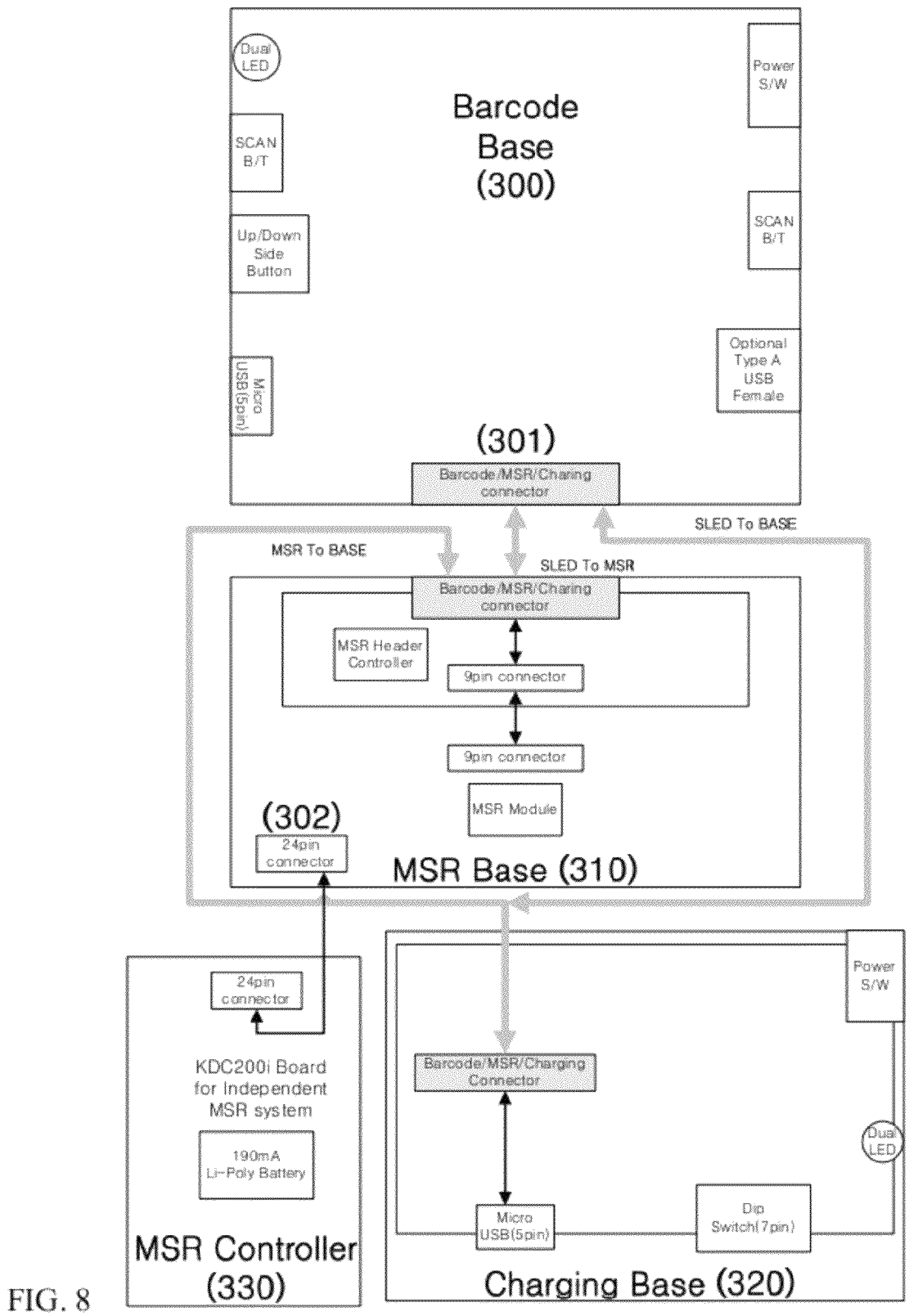
FIG. 8 is a flow chart illustrating an operational relationship between a mobile terminal and peripheral devices such as a compact bar code reader, MSR and charging base according to one embodiment of the present invention that would effectuate the novel operations performed therebetween according to one embodiment of the present invention.

Alternatively, FIGS. 3C and 3D depict an illustrative MSR independent system 160, used separate from another peripheral such as a compact bar code scanner. This embodiment will be similarly provided with features such as the illustrative power switch 161, status LED 162, and USB connector 163. The type of MSR that may be employed as a peripheral device within the context of the inventive modular system may vary. However, the present system contemplates and supports various MSR standards with different interface, especially where the illustrative KDC®400 is selected as the compact bar code reader when such peripherals are included as part of the inventive modular sled system. This variant supports both the international triple track standard and the Japanese dual header standard (e.g., one head-one/two/triple track MSR devices, as well as dual head-double track and JIS-II track). Either way, support for any given MSR standard can be supplied by provision of: (i) an internal DIP Switch (as shown in FIG. 8 and elsewhere herein); (ii) a mobile device configuration utility; and/or (iii) scanning of a special barcode, if integrated with the described barcode base 300.

Figure 6:
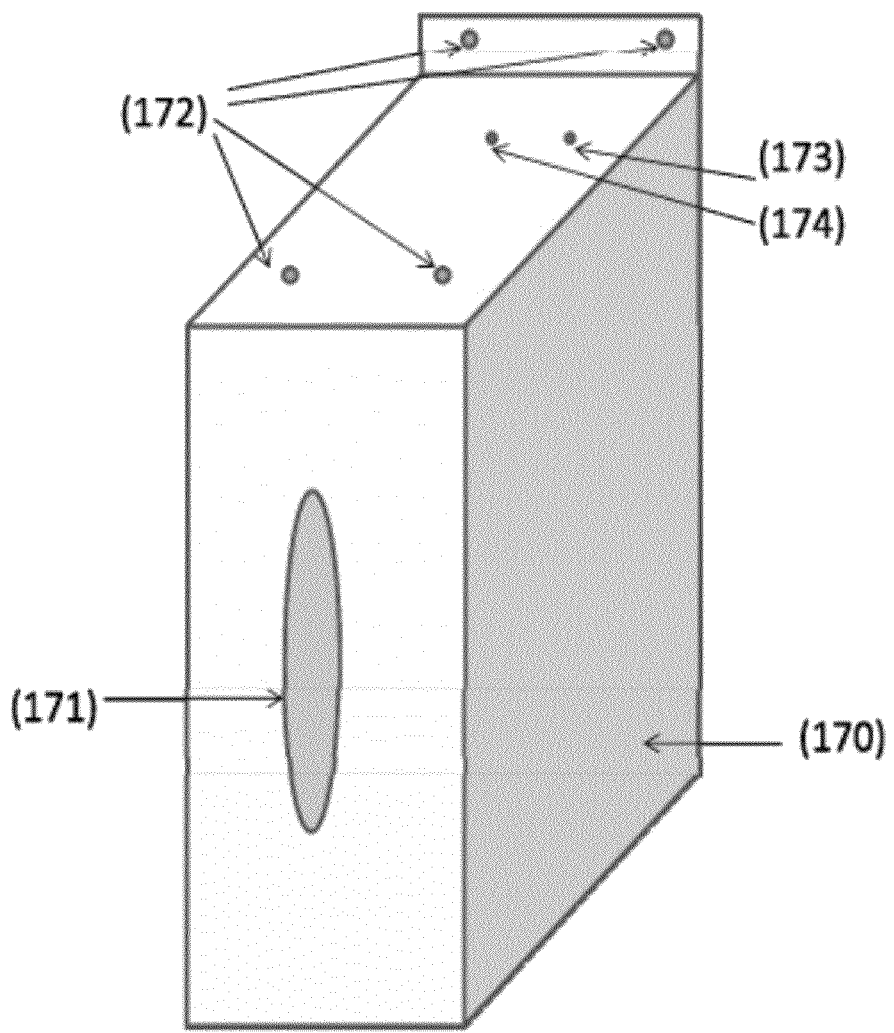
FIG. 6 depicts an three dimensional side view of an illustrative peripheral device, such as a trigger gun handle of a peripheral device trigger with illustrative features for operative connection and controls that would effectuate the novel operations performed therebetween according to one embodiment of the present invention.

With attention now to FIG. 6, a depiction is made of a trigger gun handle 170 that may be used in conjunction with the optional peripheral trigger device described elsewhere herein. The purpose of trigger gun handle 170 is to hold and pull the trigger button in more convenient way, and s supplemental device that maybe combined with the trigger described elsewhere, and may be obtained from a supplier such as Motorola Inc., of Schaumberg, Ill. As seen, this device may feature aspects such as trigger button 171, trigger gun handle mounting hole 172, ground signal contact 173 and trigger signal contact 174.

Figure 7B:
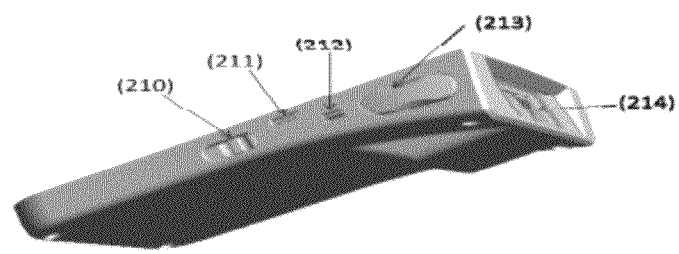
FIG. 7B depicts an offset bottom view of a variant of an illustrative peripheral device, such as a compact bar code reader with illustrative features for operative connection and controls that would effectuate the novel operations performed therebetween according to one embodiment of the present invention.

Depicted in FIGS. 7A and 7B, is an illustrative embodiment of a barcode only sled 206. As seen, this device may feature aspects such as trigger button 200, Up/Down (scroll) button 201, 8-pin micro USB connector for both sled and mobile device charging 202, hand strap holder 203, barcode scan engine (1D laser or 2D imager) 204, 214, mobile device case mounting means/screw hole 205 (as part of attachment means 20 for use with either a custom engagement structure, or a native mobile device casement engagement structure), power switch 210, status LED 211, buzzer hole 212, and trigger button 213.

Figure 7C:
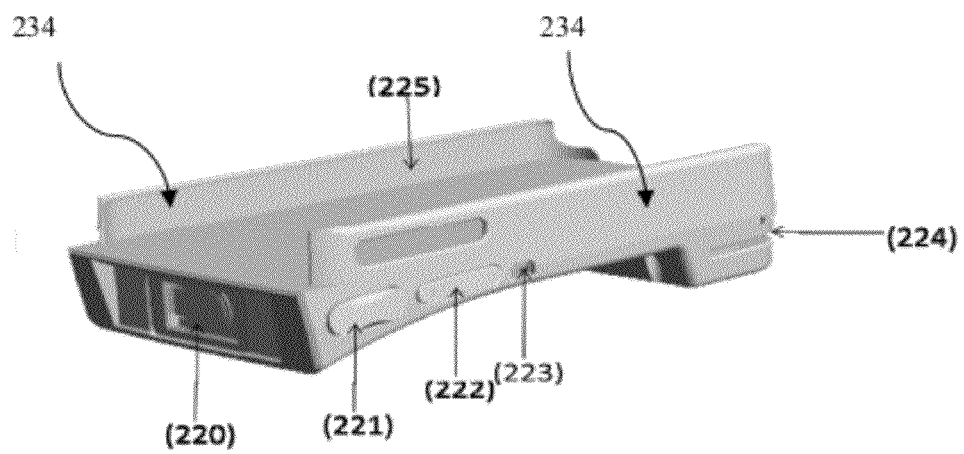
FIG. 7C depicts an offset top/frontal view of a variant of an illustrative peripheral device, such as a compact bar code reader with an illustrative attachment to a custom engagement structure with lateral engagement rails and with illustrative features for operative connection and controls that would effectuate the novel operations performed therebetween according to one embodiment of the present invention.
Figure 7D:
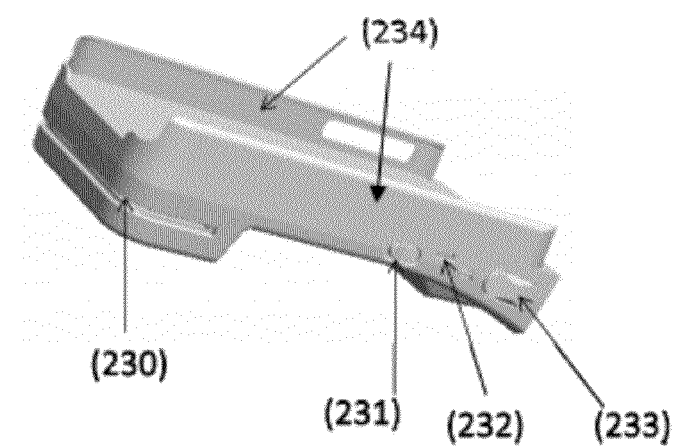
FIG. 7D depicts an offset top/side view of a variant of an illustrative peripheral device, such as a compact bar code reader with an illustrative attachment to a custom engagement structure with lateral engagement rails and with illustrative features for operative connection and controls that would effectuate the novel operations performed therebetween according to one embodiment of the present invention.

Depicted in FIGS. 7C and 7D, is an illustrative embodiment of a barcode and MSR integrated sled 225. This version, which is intended to be used within the meaning of attachment means 20 as a custom engagement structure, rather than as part of a native mobile device casement engagement structure, includes integral lateral rails 234 which slidingly engage and lock or otherwise frictionally secure a mobile device (not pictured) laterally along the length of integrated sled 225. It should be noted that, although integrated sled 225 is depicted as including both a barcode and MSR, integral lateral rails 234 are intended to be within the meaning of attachment means 20 for use with other peripheral devices by themselves (e.g., with just a compact barcode scanner, with just an MSR, with just an IC reader, or other peripheral devices), or in conjunction with each other. In any case, as seen this device may feature aspects such as the illustrative barcode scan engine (1D laser or 2D imager) 220, trigger button 221, 233, Up/Down (scroll) button 222, 8-pin micro USB connector for both sled and mobile device charging 223, MSR module 224, 230, power switch 231, and status LED 232.

Figure 7E:
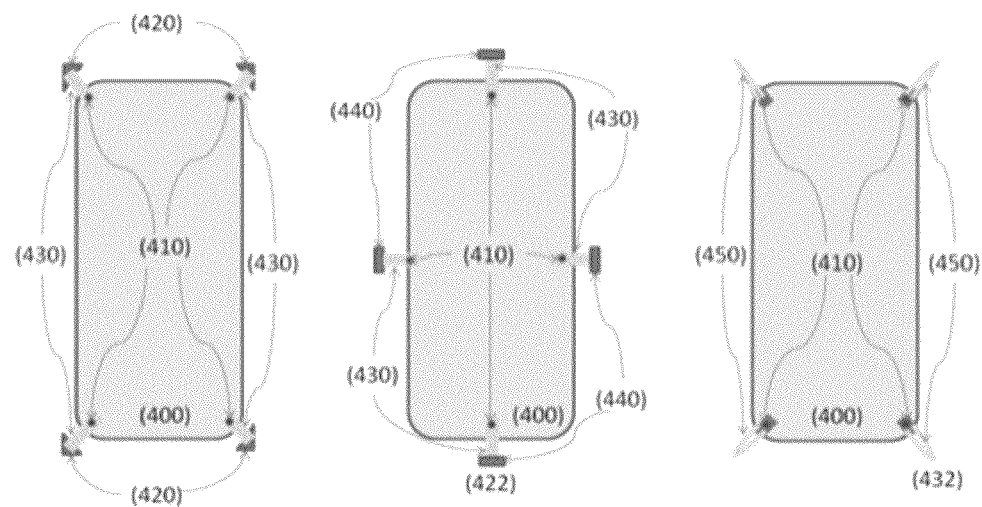
FIG. 7E depicts an schematic view of a variant of an illustrative attachment accomplished via a universal engagement structure for attachment of a peripheral device to a mobile device that would effectuate the novel operations performed therebetween according to one embodiment of the present invention.
Figure 7E:
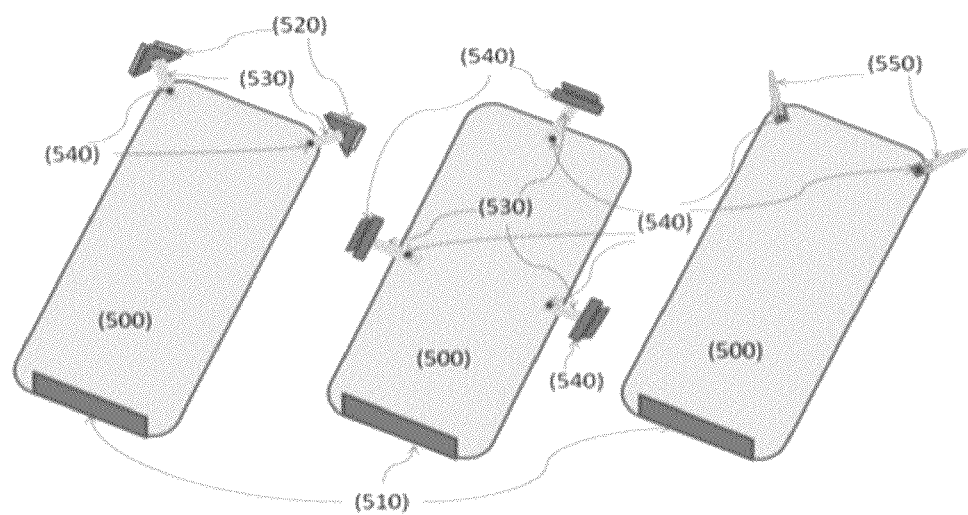

FIG. 7E depicts an schematic view of a variant of an illustrative attachment accomplished via a universal engagement structure for attachment of a peripheral device to a mobile device, which is also intended to be used within the meaning of attachment means 20. As seen, this embodiment may feature aspects such as the illustrative universal mobile device case 400, 500, mounting means/screw for plastic bar or elastic band 410, 540, plastic bar or elastic band 430, 530, circular (or triangular) corner/side holder 420, 520, elastic rubber band 450, 550, bottom guild bar 510. As can be appreciate, this variant engagement structure of the sled allows for virtually any type of mobile device to be readily combined with almost any manner of peripheral device in a secure physical fashion.

FIG. 8 illustrates an example of a block diagram representing portions of the overall of the connectivity of the various inventive aspects that can be implemented with peripheral devices such as an illustrative compact bar code scanner, MSR with MSR controller and a charging base according to one embodiment of the present invention. As seen therein, the sled may be comprised, among other things, of Barcode Base board 300 which may offer features such as status LEDs, scan, scroll and power buttons, as well as different types of USB and micro USB ports, as depicted therein for operational control and connectivity with other components of the overall system. Barcode base/MSR base/Charging base connector 301 will connect, in one embodiment, MSR Base 310 and Charging Base 320 with Barcode Base 300. To that end, MSR Base 310 may include features such as an MSR Header Controller, MSR module, and pin connectors. An MSR controller board 330 for an MSR independent system may be connected via a special pin connector at 302 to MSR Base 310. Similarly, Charging Base 320, which may include features such as a power switch, status LEDs, a 7 pin dip switch and a micro USB connector is connected via Barcode base/MSR base/Charging base connector 301 to Barcode Base board 300 and/or MSR Base 310. Note that where Charging Base 320 is provided as an optional peripheral device, it can also be used to charge mobile device 11.

Figure 9:
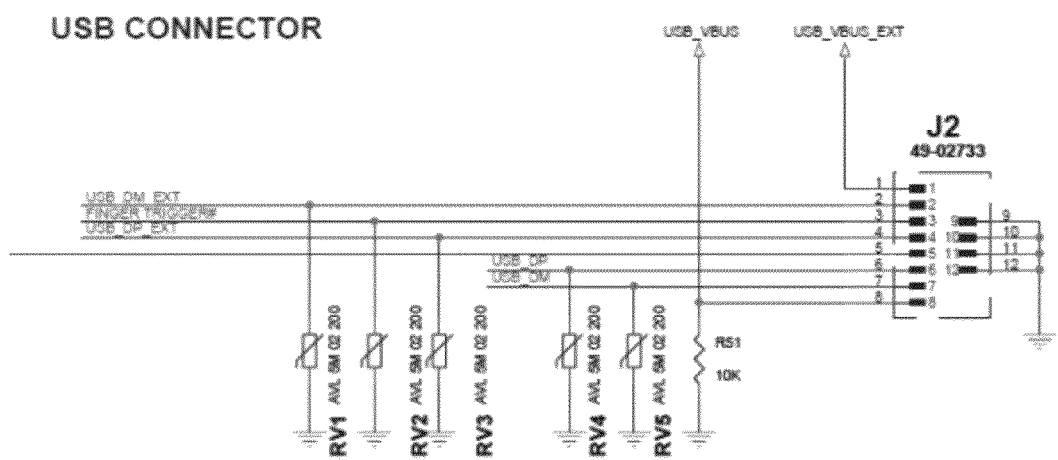
FIG. 9 is an electronic schematic of an inventive USB connector arrangement for charging a mobile device and/or a peripheral device when a charging base is included as part of the inventive modular sled system.

As it pertains to the provision of the charging base as peripheral aspect of the inventive sled, circuitry may be provided for both the charging of a peripheral such as the compact barcode reader, again illustratively shown as the KDC®400 or a KDC®400-type unit as well as for the charging of the mobile device itself. In describing this circuitry, reference will also be made for use of the optional peripheral device trigger therein. Specifically, one USB port (e.g., an 8-pin micro USB, as depicted in FIG. 9) may be provided for the above uses wherein: (i) GND and USB_VBUS pins are utilized to charge the KDC®400 or a KDC®400-type unit; (ii) the USB_DP and USB_DM signals are used to communication with another USB device, such as the mobile device (or another peripheral device); (iii) use is made of FINGER_TRIGGER# and GND signals to allow external trigger mechanism such as the peripheral trigger and/or trigger gun handle; (iv) use is made of GND, USB_VBUS_EXT, USB_DM_EXT, USB_DP_EXT signals to charge the mobile device. Thereafter, a custom cable may be developed in accordance with the above in order to connect 8-pin USB connector on the KDC®400 or a KDC®400-type unit with the mobile device (or another peripheral device). Provision of the above charging circuitry within the illustrative the KDC®400 eliminates the need for use of multiple USB ports for charging. The signal schematic grid for the above signals and operative charging elements (e.g. as achieved through the 8-pin micro USB PIN assignment arrangement discussed above) may be depicted by virtue of the below chart:

| PIN# | Signal | Base | Smartphone | Trigger |
|---|---|---|---|---|
| 1 | USB_VBUS_EXT | | O | |
| 2 | USB_DM_EXT | | O | |
| 3 | FINGER_TRIGGER# | | | O |
| 4 | USB_DP_EXT | | O | |
| 5 | GND | O | O | O |
| 6 | USB_DP | O | | |
| 7 | USB_DM | O | | |
| 8 | USB_VBUS | O | | |

When provided as described herein, the inventive system will support various charging logic, including but not limited to, the standard USB charging and mobile device-specific charging logic, such as that found in iPhone® specific charging logic. In doing so, any exemplary compact barcode reader-type peripheral, such as the aforementioned KDC400 type unit can select the matching charging logic depending on a specific user selection, which can be selecting by provision of: (i) an internal DIP Switch (as shown in FIG. 8 and elsewhere herein); (ii) a mobile device configuration utility; and/or (iii) scanning of a special barcode, if integrated with the described barcode base 300. These choices can also be illustratively implemented as a separate menu in the exemplary KDC® 400 or a KDC® 400-type unit can automatically select the charging logic depends on the exact user selection of the specific Bluetooth® profile, thereby supporting proprietary mobile device circuitry, such as an iPhone®-specific charging circuit if a given user selects an iPhone® Bluetooth connection method.

As previously mentioned, peripheral device 10 of the modular sled may be of any type of at least one of the following peripheral devices comprising: compact bar code readers, MSRs, charging bases, IC card readers, peripheral device triggers, or RF ID tag readers. Similarly, mobile device 11 is of the type chosen from the groups comprising mobile phones, smart phones, PDAs, etc. and will generally include a display for implementing interactivity with a user. Such displays often have a "soft keyboard" that is frequently used by a user in order to input data. By way of just one illustration, the example utilized herein will be a compact bar code scanner that has a configurable key for controlling the soft keyboard of the mobile device, such as that found in the illustrative KDC® 400 type unit, available from KoamTac® Inc., of Princeton, N.J., and includes a relatively smaller display for interactivity with a user, and may provide the user with different menu screens for the various functions described herein. Other menu images can be implemented on the display as necessary, and provision is also made for the configurable key therein to control mobile devices without soft keyboards. Similarly, multifunction keys, such as those found in the KDC® 400 can also be provided for various operations, including but not limited to: power ON/OFF buttons, scan buttons on both sides, and up/down (scroll) control buttons. It is worth noting, that, when choosing a compact bar code scanner as peripheral device 10, one generally would need to employ a bar code scanning unit with programming capability, or the ability to function with KTSync® type software downloaded therein, in order to provide the configuration options on any configurable keys (e.g., toggle key, menu, etc.). Accordingly, provision can be made for auto reconnection and toggling, a feature that is most useful in cases where it is found that a Bluetooth® connected device can often be abnormally disconnected due to unexpected noise in the 2.4G range Bluetooth® spectrum or for other reasons known in the art of wireless connectivity. In accordance with the above, the illustrative KDC® 400 can be reconnected to the host computer automatically by pressing the side up button, while the down button can be defined as Bluetooth® disconnection key or soft keyboard toggling key when in HID mode.

As it relates to provision of Bluetooth® profile selection, in cases where the illustrative KDC® 400 is employed as a compact barcode reader within the overall inventive modular sled system, it is worth noting that three different Bluetooth® connection modes can be supported, depending on the mobile device that is desired to be connected thereto. An SPP mode may be used to connect host devices supporting SPP or RFCOMM profiles such as Android®, Blackberry® and Microsoft Windows® that may be found on various mobile devices. As those skilled in the art will appreciate, RFCOMM profiles offer a socket-based client-server paradigm for providing services, and are typically employed where a user desires to create a client-server based application using Bluetooth®. Similarly, a Serial Port Profile (SPP) defines the requirements for Bluetooth® devices that are necessary for setting up emulated serial cable connections using RFCOMM between two peer devices, and are requirements that are expressed both in terms of services provided to applications, and by defining the features and procedures that are required for interoperability between Bluetooth® devices. Essentially, the Serial Port Profile defines the protocols and procedures that shall be used by devices using Bluetooth® for RS232 (or similar) serial cable emulation, and can even be employed with legacy applications that are using Bluetooth as a cable replacement through a virtual serial port abstraction. In one specific example, a proprietary mobile device such as an iPhone® will use an iPhone® mode to connect to iOS® devices such as iPhone®, iPad® and iPod® touch. In a separate example, an HID mode can be used to connect a host device that supports HID profiles. In any case, these various Bluetooth profiles can be configured from a native mobile device configuration utility or through the use of scanning of special barcodes. Additionally, special Bluetooth® management software such as the KTSync® software, also available from KoamTac° Inc., of Princeton, N.J. may also be employed to effectuate provision of the above. Alternatively, a unit such as an illustrative KDC® 200 or KDC® 300 type unit (also available from KoamTac® Inc., of Princeton, N.J.) already has specialized built in Bluetooth® management software (such as that found in KTSync®), may also be utilized.

As it relates to provision of Bluetooth® pairing and connection procedures, in cases where the illustrative KDC® 400 is employed as a compact barcode reader within the overall inventive modular sled system, the several different approaches are supported. Specifically: (i) a user can set up the illustrative KDC® 400 to enter pairing mode automatically upon powering on; (ii) a user can set up the illustrative KDC® 400 to enter pairing mode upon powering on and by pressing certain combination of KDC® 400 buttons; (iii) the illustrative KDC® 400 can be programmed to exit the pairing and connection mode if a pairing and connection status is successfully achieved, or if otherwise timed out; and/or (iv) a user also can abort the pairing and connection procedure by simply pressing certain combination of KDC® 400 buttons. It is noted, in accordance with the disclosure elsewhere herein, a dual (Bluetooth®) port can be provided for the above-referenced connectivity aspects, with a first port connecting the sled and the mobile device, and a second port connecting the sled and other peripheral Bluetooth® devices described herein, as well as physically separate peripheral devices such as Bluetooth® connected printers and the like.

Within the aforementioned schemes, specific additional features may further be utilized according to the present invention within the sled as a feature of a peripheral such as the illustrative KDC®400. For example, status LEDs (of different colors), vibrators, or beepers/buzzers may be provided in order to let users know operational statuses such as: (i) scan success or failure; (ii) Bluetooth® pairing and connection; (iii) Bluetooth® profile; and/or (iv) battery charging or low battery. Although not meant to be limiting in any way as it pertains to the disclosure and coverage of the invention, one might employ the following status signifiers shown in the table below for possible KDC®400 (or other peripheral device) settings in the modular sled:

|  | LED | BEEPER | VIBRATOR |
| --- | --- | --- | --- |
| Scan success | Green | Short | Short |
| Scan failure | RED | Long | Long |
| Bluetooth Pairing | Green: iPhone mode<br>Red: SPP mode<br>Orange: HID mode | N/A | N/A |
| Bluetooth connection | N/A | Short | N/A |
| Bluetooth disconnection | N/A | Long | N/A |
| Battery charging | Red | N/A | N/A |
| Full charged | Green | N/A | N/A |
| Low battery | Orange | N/A | N/A |

I claim:

1. A mobile device and peripheral device consolidation system for improved physical and electronic interoperability between a mobile device and at least one peripheral device, said mobile device and peripheral device consolidation system comprising:
   (a) a modular sled having an attachment means for physically attaching said at least one peripheral device to said mobile device, said attachment means for attaching said at least one peripheral device to said mobile device providing at least one point of secure attachment with at least one of the following of a custom engagement structure, universal engagement structure, or a native mobile device casement engagement structure, said modular sled further including engagement structure for cooperatively securing said at least one peripheral device physically proximate to said mobile device;
   (b) said modular sled further including at least one of the following of said at least one peripheral devices chosen from the group consisting of: compact bar code readers, Magnetic Strip Readers (MSRs), Integrated Circuit (IC) card readers, peripheral device triggers, or Radio Frequency Identification (RFID) tag readers;
   (c) said modular sled further including electronic circuitry for wireless electronic communication connectivity between said mobile device and said at least one peripheral device;
   (d) wherein said modular sled further includes a charging base for charging said at least one peripheral device and said mobile device.

2. The mobile device and peripheral device consolidation system for improved physical and electronic interoperability between a mobile device and at least one peripheral device of claim 1, wherein said modular sled further includes:
   (a) a memory unit configured to store instructions;
   (b) at least one configurable key for implementing, between the mobile device and the peripheral device, user commands that are selected from the group comprising at least one of the following of a toggle command, a wake up process, a connection process, a data collection process, a synchronization process, and a transmission process;
   (c) a processor connected to said at least one configurable key, both of which are configured to execute instructions for executing at least the following instructions:
     (i) establishing a wireless connection between said at least one peripheral device and said mobile device upon receiving a user data connection process command;
     (ii) executing a data collecting function of said at least one peripheral device upon receiving a user data collection process command;
     (iii) executing a synchronization process, if required;

(iv) transmitting, any data collected during said data collecting function, from said at least one peripheral device, to said mobile device.

3. The mobile device and peripheral device consolidation system for improved physical and electronic interoperability between a mobile device and at least one peripheral device of claim 2, wherein said at least one configurable key of said at least one peripheral device includes multifunction keys and peripheral device keys for controlling said mobile device.

4. The mobile device and peripheral device consolidation system for improved physical and electronic interoperability between a mobile device and at least one peripheral device of claim 3, wherein said at least one peripheral device includes at least one said compact bar code reader and at least one said MSR.

5. The mobile device and peripheral device consolidation system for improved physical and electronic interoperability between a mobile device and at least one peripheral device of claim 4, wherein said modular sled includes charging circuitry that utilizes only one charging port for charging said mobile device when said mobile device is connected to said at least one said compact bar code reader.

6. The mobile device and peripheral device consolidation system for improved physical and electronic interoperability between a mobile device and at least one peripheral device of claim 5, wherein said at least one said compact bar code reader includes a peripheral device trigger connected thereto, wherein said peripheral device trigger is chosen from the group comprising a side scan button or a no-power supplied trigger.

7. The mobile device and peripheral device consolidation system for improved physical and electronic interoperability between a mobile device and at least one peripheral device of claim 6, wherein said modular sled includes a dual wireless communication port having a first port that connects said modular sled with said mobile device, and having a second port that connects said modular sled with another said at least one peripheral device.

8. The mobile device and peripheral device consolidation system for improved physical and electronic interoperability between a mobile device and at least one peripheral device of claim 7, wherein at least one said MSR is chosen from the group of an international triple track MSR or a Japanese dual header MSR.

9. The mobile device and peripheral device consolidation system for improved physical and electronic interoperability between a mobile device and at least one peripheral device of claim 8, wherein said attachment means for attaching said at least one peripheral device to said mobile device provides said at least one point of secure attachment thereto through a custom engagement structure.

10. The mobile device and peripheral device consolidation system for improved physical and electronic interoperability between a mobile device and at least one peripheral device of claim 8, wherein said attachment means for attaching said at least one peripheral device to said mobile device provides said at least one point of secure attachment thereto through a native mobile device casement engagement structure.

11. The mobile device and peripheral device consolidation system for improved physical and electronic interoperability between a mobile device and at least one peripheral device of claim 8, wherein said attachment means for attaching said at least one peripheral device to said mobile device provides said at least one point of secure attachment thereto through a universal engagement structure.

12. The mobile device and peripheral device consolidation system for improved physical and electronic interoperability between a mobile device and at least one peripheral device of claim 3, wherein said at least one peripheral device includes at least one said compact bar code reader and at least one said IC card reader.

13. The mobile device and peripheral device consolidation system for improved physical and electronic interoperability between a mobile device and at least one peripheral device of claim 3, wherein said at least one peripheral device includes at least one said compact bar code reader and at least one said RFID tag reader.

* * * * *